Figure 1:
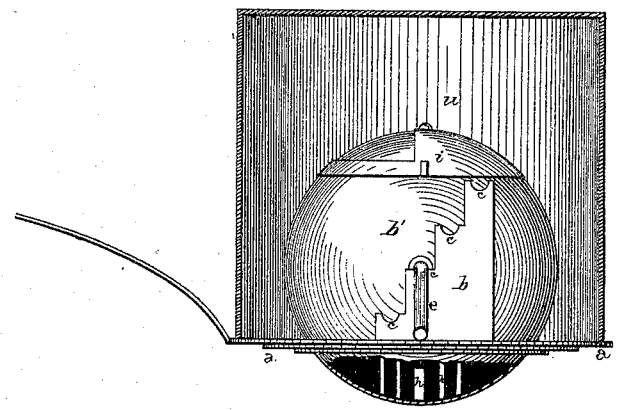

W. H. WELCH.
Coffee-Roasters.

No. 139,984. Patented June 17, 1873.

WITNESSES.
W. K. Duhamel
Alex Davidson

INVENTOR.
Wm. H. Welch.
Per H. H. Abbot
Attorney.

UNITED STATES PATENT OFFICE.

WILLIAM H. WELCH, OF BLOOMINGTON, ILLINOIS.

IMPROVEMENT IN COFFEE-ROASTERS.

Specification forming part of Letters Patent No. 139,984, dated June 17, 1873; application filed March 5, 1873.

*To all whom it may concern:*

Be it known that I, WM. H. WELCH, of Bloomington, county of McLean and State of Illinois, have invented certain new and useful Improvements in Coffee-Roasters, of which the following is a specification:

My invention relates to the construction of a coffee-roaster and corn-popper; and consists in, first, a rim made to fit a number of different-sized holes, and provided with two standards having notches or catches made in their sides, so that the devices used for popping corn or roasting coffee can be lowered to or raised up from the fire; second, in the device used for roasting coffee or popping corn, which consists of a globe or sphere provided with journals and a crank, so that it can be revolved freely around, all of which will be more fully set forth hereafter.

Figure 1 represents a side elevation of my invention, showing the roaster and popper.

*a* represents a rim made to fit different-sized holes, and which has a standard, *b*, secured to opposite sides, having the notches or catches *c*, arranged one above the other, made in its sides, so that the devices used in connection with the rim can be lowered down to the fire or raised up from it. *b'* is a hollow globe or sphere, made of sheet or cast iron or wire, and which is used for roasting coffee or popping corn, and which is made round so that it will fit all-sized holes. It is provided with journals, so as to fit or rest in the notches *c* of the standards, and a crank, *e*, by which it may be revolved, so as to stir up its contents. The cover *i* may be of any suitable construction, and in the bottom of the globe is secured the projections *h*, so as to act as stirrers to the corn or coffee.

By placing the cover *u* over the devices while being used all smoke and gas are prevented from escaping into the room from the fire. By the use of the adjustable standards the heat can be regulated so as to suit the article being cooked, and can thus be made to cook slowly or rapidly, as may be desired, as well as save fuel.

Having thus described my invention, what I claim as new, and desire to secure by Letters Patent, is—

1. The rim *a* having the notched standards *b*, substantially as set forth.

2. The rim *a* provided with standards *b* and cover *u*, in combination with globe *b'*, all arranged and operated for the purpose of retaining the aroma of coffee during the process of roasting.

In testimony that I claim the foregoing as my invention I hereunto affix my signature this 22d day of February, 1873.

WILLIAM H. WELCH.

Witnesses:
W. L. McCART,
W. T. M. MILLER.